US008114377B2

(12) United States Patent
Eaton et al.

(10) Patent No.: US 8,114,377 B2
(45) Date of Patent: Feb. 14, 2012

(54) PROCESS FOR PRODUCING TITANIUM DIOXIDE PARTICLES HAVING REDUCED CHLORIDES

(75) Inventors: Alan Roger Eaton, Hendersonville, TN (US); Rajeev Lochan Gorowara, Wilmington, DE (US); Narayanan Sankara Subramanian, Hockessin, DE (US); Stephen William Taylor, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/591,775

(22) Filed: Nov. 2, 2006

(65) Prior Publication Data

US 2008/0187486 A1    Aug. 7, 2008

(51) Int. Cl.
*C01G 23/047*    (2006.01)
(52) U.S. Cl. .................. 423/613; 423/610; 423/614
(58) Field of Classification Search ........... 423/610–616
See application file for complete search history.

(56) References Cited

U.S. PATENT DOCUMENTS

| | | | |
|---|---|---|---|
| 2,032,827 A | 3/1936 | Andrews | |
| 2,485,440 A | 11/1949 | Schaumann | |
| 2,488,439 A | 11/1949 | Schaumann | |
| 2,721,626 A | 10/1955 | Rick | |
| 2,899,278 A | 8/1959 | Lewis | |
| 3,088,840 A * | 5/1963 | Whayman et al. | 106/437 |
| 3,208,866 A | 9/1965 | Lewis et al. | |
| 3,253,889 A * | 5/1966 | Wildt et al. | 423/613 |
| 3,475,258 A | 10/1969 | Rahn et al. | |
| 3,511,308 A | 5/1970 | Nerlinger | |
| 3,726,484 A | 4/1973 | Schurr | |
| 3,839,063 A * | 10/1974 | Beliveau | 106/437 |
| 3,856,929 A * | 12/1974 | Angerman et al. | 423/613 |
| 4,012,201 A * | 3/1977 | Powell et al. | 422/151 |
| 4,013,782 A * | 3/1977 | Powell et al. | 423/613 |
| 4,083,946 A | 4/1978 | Schurr et al. | |
| 4,097,301 A * | 6/1978 | Wildt | 106/437 |
| 4,462,979 A | 7/1984 | Stevens et al. | |
| 4,569,387 A | 2/1986 | Hartmann et al. | |
| 4,784,841 A | 11/1988 | Hartmann et al. | |
| 4,937,064 A | 6/1990 | Gonzalez | |
| 5,201,949 A | 4/1993 | Allen et al. | |
| 5,264,033 A * | 11/1993 | Noda et al. | 106/447 |
| 5,266,108 A | 11/1993 | Hauck | |
| 5,562,764 A | 10/1996 | Gonzalez | |
| 5,728,205 A | 3/1998 | Allen et al. | |
| 5,922,120 A | 7/1999 | Subramanian et al. | |
| 6,145,765 A | 11/2000 | Capelle, Jr. et al. | |
| 6,440,383 B1 * | 8/2002 | Duyvesteyn et al. | 423/611 |
| 6,852,306 B2 | 2/2005 | Subramanian et al. | |
| 7,029,648 B2 | 4/2006 | Subramanian et al. | |
| 2005/0023992 A1 | 2/2005 | Lee et al. | |
| 2006/0012730 A1 | 1/2006 | Chen et al. | |
| 2007/0009525 A1 | 1/2007 | Yu et al. | |

FOREIGN PATENT DOCUMENTS

| | | |
|---|---|---|
| WO | WO02/074426 | 9/2003 |
| WO | WO03/074426 A1 * | 12/2003 |
| WO | WO2007/053584 | 5/2007 |

OTHER PUBLICATIONS

International Search Report, Apr. 22, 2008.

* cited by examiner

*Primary Examiner* — Stanley Silverman
*Assistant Examiner* — Anthony J Zimmer

(57) ABSTRACT

This disclosure relates to process for producing titanium dioxide pigment having reduced chlorides, comprising: a) reacting titanium tetrahalide vapor, rutile-forming agent and at least a stoichiometric amount of oxygen in a reactor to form a gaseous suspension comprising titanium dioxide particles; b) introducing silicon tetrachloride into the reactor at least one point downstream of the point of contact of the titanium tetrahalide, the rutile forming agent and the oxygen, and where at least 97% of the titanium tetrahalide has been converted to titanium dioxide to provide a substantially uniform encapsulation of pyrogenic $SiO_2$ on the titanium dioxide; c) passing the gaseous suspension to a cooling conduit; d) introducing scouring material, typically selected from the group of calcined titanium dioxide and compressed titanium dioxide, and mixtures thereof, into the cooling conduit; wherein the particles of the scouring material have a diameter in the range of about 0.25 mm to about 12.7 mm and forming a cooled product having a solid and a vapor phase; e) separating the vapor phase from the cooled product to form a powder comprising the titanium dioxide particles, and a content of chlorine-containing material ranging from about 500 to about 3000 ppm of oxychloride, and the scouring material; and f) subjecting the powder to substantially uniform heating at a temperature of about 200° C. to about 600° C., in the presence of moisture, to reduce the content of chlorine-containing material to less than about 60 ppm oxychloride; wherein the moisture present is in at least a stoichiometric amount with the oxychloride.

14 Claims, No Drawings

PROCESS FOR PRODUCING TITANIUM DIOXIDE PARTICLES HAVING REDUCED CHLORIDES

BACKGROUND OF THE DISCLOSURE

1. Field of the Disclosure

The present disclosure relates to an improved process for making titanium dioxide pigment, and in particular to an improved finishing process for making titanium dioxide pigments having reduced chlorides.

2. Background of the Disclosure

In producing pigmentary titanium dioxide ($TiO_2$) in rutile form a titanium tetrahalide such as titanium tetrachloride ($TiCl_4$) along with a rutile formation agent such as aluminum trichloride ($AlCl_3$) is reacted in the vapor phase with an oxygen-containing gas in a reactor at a temperature in the range of about 900° C. to 1600° C. to produce a hot gaseous suspension of $TiO_2$ solid particulate and free chlorine. This hot gaseous suspension must be quickly cooled below 600° C. within about 1-60 seconds following discharge of the suspension from the reactor. This cooling is accomplished in a conduit, e.g., a flue, which is externally cooled with flowing water so that undesired $TiO_2$ particle size growth is prevented and particle agglomeration is minimized. Particle size and particle agglomeration are important $TiO_2$ pigment properties.

It is known that the production of titanium dioxide pigment may be improved when the $TiCl_4$ and an oxygen-containing gas are reacted in the presence of a nucleant. The method provides $TiO_2$ pigment having improved particle size uniformity, color, and in-process bulk density.

In the manufacturing methods disclosed, the $TiO_2$ particles have a strong tendency to deposit on the inner walls of the cooling conduit. The cooled $TiO_2$ particles tend to form adherent layers on the inner walls and can cause plugging of the conduit. Further, the $TiO_2$ deposits are poor heat conductors and the internal surfaces of the cooling conduit can become insulated which inhibits the heat-exchange properties of the conduit. Current practice is to inject granular scouring particles (known as scrubs; examples are water-soluble salts like NaCl, KCl, CsCl or insoluble oxides such as $TiO_2$ or $SiO_2$.

The titanium dioxide formed is then subjected to wet treatment, filtration, and drying before the particles are subjected to micronization processes. When the scrubs are water soluble, they dissolve and are removed from the pigment during these processing steps. When they are insoluble, they are separated either by wet screening or by other techniques.

A need exists for a streamlined finishing process that eliminates the need for the wet treatment, filtration, and drying steps and results in titanium dioxide particles having reduced chlorides.

SUMMARY OF THE DISCLOSURE

The present disclosure provides a process for producing titanium dioxide pigment having a reduced content of chlorine-containing material, comprising:

a) reacting titanium tetrahalide vapor, rutile-forming agent, such as aluminum halide and at least a stoichiometric amount of oxygen in a reactor to form a gaseous suspension comprising titanium dioxide particles;

b) introducing silicon tetrachloride into the reactor at least one point downstream of the point of contact of the titanium tetrahalide, the rutile forming agent and the oxygen, and where at least 97% of the titanium tetrahalide has been converted to titanium dioxide;

c) passing the gaseous suspension to a cooling conduit;

d) introducing scouring material, typically selected from the group of calcined titanium dioxide and compressed titanium dioxide, and mixtures thereof, into the cooling conduit; wherein the particles of the scouring material have a diameter in the range of about 0.25 mm to about 12.7 mm and forming a cooled product having a solid and a vapor phase;

e) separating the vapor phase from the cooled product to form a powder comprising the titanium dioxide particles, about 500 to about 3000 ppm of oxychloride, and the scouring material; and f) subjecting the powder to substantially uniform heating at a temperature of about 200° C. to about 600° C., in the presence of moisture, to reduce the content of chlorine-containing material to less than about 60 ppm, more typically about 30 to about 40 ppm; wherein the moisture present is in at least a stoichiometric amount with the oxychloride.

In the first aspect, the disclosure further provides a process wherein in step (f) the size of at least the titanium dioxide particles of the powder are reduced to a mean particle size of about 50 nm to about 1000 nm.

The chlorine-containing materials of this disclosure are one or more products removed from the powder by the uniform heating step which can dechlorinate or dechloridate the powder. The chlorine-containing materials can comprise about 500 to about 3000 ppm of one or more oxychlorides and more particularly, free chlorine ($Cl_2$) and oxychlorides and mixtures thereof. The oxychlorides result from contacting chloride-containing reactants, such as titanium tetrachloride, aluminum trichloride, silicon tetrachloride, and oxygen in the production of titanium dioxide. The analytical method for determining the content of chlorine-containing materials of the powder measures the content of residual chlorides in the powder.

DETAILED DESCRIPTION OF THE DISCLOSURE

The production of $TiO_2$ pigment by vapor phase oxidation of a tetrahalide, particularly $TiCl_2$, in the presence of a nucleant is known and disclosed in Lewis et al., U.S. Pat. No. 3,208,866 and Allen et al., U.S. Pat. No. 5,201,949, the disclosures of which are incorporated herein by reference. The present disclosure relates to an improvement in the aforementioned processes.

In the production of $TiO_2$ pigment by the vapor phase oxidation of titanium tetrahalide, various titanium tetrahalides such as titanium tetrachloride, titanium tetrabromide, and/or titanium tetraiodide may be used, but it is preferable to use $TiCl_4$. First, $TiCl_4$ is evaporated and preheated to temperatures of from about 300° C. to about 650° C. and introduced into a reaction zone of a reaction vessel. Rutile forming agents such as aluminum halides, selected from the group of $AlCl_3$, $AlBr_3$ and/or $AlI_3$, that are present in amounts sufficient to provide about 0.5 to about 10% $Al_2O_3$, typically about 0.5 to about 5%, and more typically about 0.5 to about 2% by weight, based on total solids formed in the oxidation reaction, are thoroughly mixed with the $TiCl_4$ prior to its introduction into the reaction zone of the reaction vessel. Typically, $AlCl_3$ is used in the process of this disclosure. However, it is also recognized that other co-oxidants and rutile promoters may be added at this point or further downstream in the process.

The oxygen containing gas is preheated to at least 1200° C. and is continuously introduced into the reaction zone through a separate inlet from an inlet for the $TiCl_4$ feed stream. By "reaction zone", it is meant the length of the reactor in which substantial reaction of the reactants takes place. The reaction of $O_2$ and $TiCl_4$ in the vapor phase is extremely fast and is followed by a brief period of particle growth. The oxygen containing gas which is introduced into the reaction zone contains a nucleant. By "nucleant", it is meant any substance which can reduce the particle size of the pigment such as metals, oxides, salts, or other compounds of sodium, potassium, lithium, rubidium, cesium, calcium, barium, strontium, or mixtures thereof. The salts, CsCl and KCl, are typical for use in this disclosure.

The pressure for carrying out the oxidation reaction may typically be at least 10 pounds per square inch gage (psig). More typically, the pressure may be at least 20 psig. The upper pressure limit may be the practical upper limit of the process, e.g., typically about 200 psig. The residence time of the reactants in the mixing zone of the reactor may be at least 1 millisecond, typically at least 3 milliseconds. The maximum residence time may be about 25 milliseconds. Typically, the residence time is in the range of about 1 to about 25 milliseconds. By "mixing zone", it is meant the length of the reactor in which substantial mixing of the reactants takes place. The reaction temperature may be at least 800° C. and typically in the range of about 800° C. to about 1800° C. Typically, the reaction occurs in the presence of water vapor.

The addition of silicon tetrachloride according to the present disclosure is made when the conversion of titanium tetrachloride to titanium dioxide is nearly complete. For example, at least 97% of the titanium tetrachloride has been converted to titanium dioxide. That is, the point where not more than 3% of the titanium tetrachloride remains unreacted. From their work the inventors have found that the point in the reactor where about 3% of the titanium tetrachloride is unreacted, the fraction of particles having full, complete coverage by the surface treatment is about 85%. At the point in the reactor where about 2% of the titanium tetrachloride is unreacted, the fraction of particles having full, complete coverage by the surface treatment is about 95%. At the point in the reactor where about 1% of the titanium tetrachloride is unreacted, the fraction of particles having full, complete coverage by the surface treatment is more than about 98%. The corresponding amount of titanium tetrachloride converted to titanium dioxide at these points is at least 97%, at least 98% and at least 99%, respectively.

When the present process is run as preferred, with at least the stoichiometric amount of oxygen, the addition points for silicon tetrachloride may be calculated by the following equations:

$$K = \frac{[2(100\% - u_{TiCl4}) + \phi \times 100\%]^2}{u_{TiCl4}(\beta + u_{TiCl4})}$$

and $$T < \frac{20733}{\ln K + 6.391} - 273.15$$

where
$u_{TiCl4}$=unreacted TiCl4(%)
$\beta$=excess O2(%)
$\phi$=feed Cl2 mole ratio (mol/mol TiCl4), and
T=temperature (C)
K is the equilibrium constant for the reaction of the present process:

$TiCl_4 + O_2 \rightarrow TiO_2 + 2Cl_2$;

Using this equation, one may calculate the point where the silicon tetrachloride is first introduced from the feeds going into the reactor. Excess oxygen, $\beta$, is the oxygen in excess of that required to convert the mixture of titanium tetrachloride and aluminum trichloride fed into the reactor to their respective oxides (the stoichiometric amount). The feed chlorine mole ratio, $\phi$, is the ratio of the moles of chlorine fed divided by the moles of titanium tetrachloride fed to the reactor over a fixed period of time, for example, per hour. The percent unreacted titanium tetrachloride, $u_{TiCl4}$, is not more than 3% as is required by the present disclosure. Using the calculated equilibrium constant, K, one can then solve for the temperature at the point where silicon tetrachloride is first introduced according to the present disclosure. The point in the reactor where this introduction is made according to the present disclosure may be determined using the temperature profile of the particular reactor. This calculation is independent of reactor size and pressure and requires only knowledge of the feed composition (oxygen, chlorine and titanium tetrachloride in moles per hour) and the temperature profile for the reactor. Temperature profiles for a given reactor may be determined from well-known thermodynamic and heat transfer principles.

This method of calculating the addition points provide some flexibility, based on the feed mix that may be of importance in designing product features to serve a particular pigment end use application. This process may result in a substantially uniform encapsulation of pyrogenic $SiO_2$ on the titanium dioxide as disclosed in U.S. Pat. No. 6,852,306. By substantially uniform encapsulation" we mean the surface of the titanium dioxide particle is predominantly covered with a layer of pyrogenic metal oxide.

The hot gaseous suspension of $TiO_2$ particulate may then be rapidly cooled in order to prevent undesirable particle growth. In accordance with this disclosure, cooling of the hot gaseous suspension may be performed by methods known in the art. These methods typically involve passing the hot gaseous suspension through a cooling conduit having relatively cool walls in comparison to the gaseous suspension. The walls of the conduit may typically be cooled by passing cool fluid externally over the walls. For example, the conduit may be immersed in cool water. Various forms of conduits or flues which are typically cooled by water externally, may be used in the process of this disclosure. Examples include, but are not limited to, conventional round pipes and conduits which are described in greater detail in U.S. Pat. Nos. 2,721,626; 3,511, 308; 4,462,979; 4,569,387; and 4,937,064 (finned flue). The benefits provided by the process of this disclosure may be especially apparent as the diameter of the conduit is increased. As the hot $TiO_2$ particles come in contact with the relatively cooler surfaces of the inner walls, the particles deposit on the walls and cool to form adherent layers. These deposits and scale may reduce the cooling rate of the reaction mass thereby affecting the quality of the pigment formed.

Granular scouring particles may be introduced into the conduit, to remove the $TiO_2$ deposits and substantially improve the quality of pigment formed. Typically, granular scouring particles useful in this disclosure may include calcined or compressed $TiO_2$. Calcined $TiO_2$ scrubs are disclosed in U.S. Pat. Nos. 5,728,205 and 4,784,841. Compressed $TiO_2$ scrubs are disclosed in U.S. Pat. No. 5,266,108. Water-soluble salts are less useful in as much as they cannot be left in the pigment and are not easily separated. Likewise for insoluble materials other than titania. However materials that disappear such as dry ice, or oxidizable, volatile solid chlorides such as $AlCl_3$ or $PCl_3$ that can result in materials that now become part of the product may be used. If the process does not include a scouring particles removal step, minor amounts of other scouring particles may be present as long as they do not deleteriously affect the quality of the titanium dioxide that is prepared.

In this disclosure, the scouring particles typically have a diameter (size distribution) in the range from about 60 mesh (0.0098 inches or 0.250 mm) to about 0.5 inches (12.7 mm). Typically at least 80 wt. %. of the particles will be of a size 10 mesh (0.0787 inches or 2.00 mm) or larger. More typically at least 90% of the particles will be of a size 10 mesh or larger. Particle size distribution of the scouring particles is very important since use of proper size is essential in providing scrubbing action. If the particle size is too small, the particles will have little kinetic energy for removing wall scale on impact, thus they are more likely to adhere to the wall and become part of the wall scale via solid-state sintering. If the particle size is too large, this may cause feeding problems and insufficient surface area to provide the scrubbing required.

The amount of scouring particles used is variable and will depend upon the particular needs. Typically, the addition of an amount of scouring particles ranging from about 0.5 to about 20 wt. % scouring particles, typically from about 3 to 10 wt. %, based on total $TiO_2$ suspended solids will be found adequate to effect the desired removal of accumulated pigment deposits and will allow a relatively high, uniform rate of heat removal from the product stream. It will be appreciated by those skilled in the art that enough scouring particles must be added to bring the reaction mass at the end of the conduit to a temperature compatible with downstream process equipment such as cyclones, filters, screw conveyers, etc. Such temperatures may be in the range of about 100° C. to about 600° C.

The scouring particles may be added to the conduit by any suitable means. For example, the scouring particles may be added intermittently or continuously by gravity from a hopper (or bin) through a solids metering valve to the flue. Continuous feeding to the $TiO_2$ suspension under treatment is typical. The scouring particles may be added at any convenient point in the system but are most conveniently added at the front end of the conduit as the product stream discharges from the reactor. Further, the scouring particles may be added at a multiple of addition points and especially at those points adjacent to which a relatively severe build-up occurs due to the configuration of the apparatus, such as at return or other forms of bends employed in the system.

Typically, the scouring particles used in this disclosure do not need to be removed from the $TiO_2$ pigment, and they remain with the pigment and are reduced to the required size along with the pigment in step (e). Any other scouring particles that are capable of being reduced to the desired particle size along with the pigment, disappearing scouring particles and those that are dry separable that were discussed earlier are also useful in this disclosure.

In the present disclosure, process variables such as pressure, reaction temperature, nucleant level and scrubs rate can be adjusted to achieve desired pigment properties such as CBU or agglomeration extent over a wide range of production rates.

The titanium dioxide particles and the oxychloride particles along with the scouring particles are then separated from the vapor phase by techniques known to one skilled in the art. In a specific embodiment a cyclone may be used to achieve this separation. The titanium dioxide particles, the oxychloride particles and the scouring particles obtained here are in powder form.

The titanium dioxide particles, the oxychloride particles and the scouring particles that are in powder form may then be subjected to dechlorination/-dechoridation in step f). Dechlorination is defined as the process of gas-stripping free chlorine ($Cl_2$) and dechloridation is defined as the process of de-adsorbing chlorides from the pigment surface and gas-stripping the resulting products, i.e. hydrochloric acid (HCl), that have affinity to the pigment surface. The chloride content is reduced to less than about 60 ppm, more typically less than about 30 to about 40 ppm. The titanium dioxide particles and the scouring particles may then be subjected to particle size reduction using know techniques resulting in a particle size of about 50 nm to about 1000 nm, and more typically about 100 nm to about 250 nm.

Alternately, the titanium dioxide particles, the oxychloride particles and the scouring particles that are in powder form may then be simultaneously subjected to dechlorination/-dechoridation, and particle size reduction in step f) and the titanium dioxide particles, the oxychloride particles and the scouring particles are typically reduced to a particle size of about 50 nm to about 1000 nm, and more typically about 100 nm to about 250 nm. This also reduces the chloride content to less than about 60 ppm, more typically less than about 30 to about 40 ppm. This may be accomplished by substantially uniform heating at temperatures of about 200° C. to about 600° C., more typically about 250° C. to about 400° C., and most typically about 250° C. to about 300° C. If the temperature of the powder entering step (f) is high, less energy is needed in step (f) for particle size reduction and to lower the chloride content of the powder. Typically, the temperature of the powder as it enters step (f) is 20° C. to about 375° C., more typically 100° C. to about 250° C. The higher temperatures could be a result of less scouring particles being used in step (d), which would result in fewer particles having to be ground down to the required particle size, thereby requiring less energy consumption. In a typical embodiment, the simultaneous dechlorination/-dechoridation and particle size reduction in step f) may be accomplished in a fluid energy mill such as a micronizer. The required fluid temperature of about 300° C. to about 700° C., more typically about 350° C. to about 500° C., and most typically about 350° to about 400° C. may be accomplished by using heated fluids selected from the group of steam, air, argon, helium, nitrogen and mixtures thereof. Some suitable fluid energy mills are disclosed in U.S. Pat. No. 3,726,484 (Schurr) and U.S. Pat. No. 6,145,765 (Capelle). Some suitable fluid energy mills may be obtained from Fluid Energy Processing & Equipment Company, Hatfield, Pa., or from Hosokawa Micron Powder Systems, Summit, N.J. or Sturtevant, Inc., Hanover, Mass. Grinding aids such as TMP (Trimethylolpropane), chemical structure=$C_2H_5C(CH_2OH)_3$ and TEA (Triethanolamine), chemical structure=$(HOCH_2CH_2)_3N$, may be used to improve grinding efficiency.

Step (f) is usually carried out in a space having a vapor space and a pigment space and the amount of free chlorine in the vapor space is less than about 1 ppm, the vapor space being above the pigment space.

The powders formed in step (f) may be used in any fashion known to one skilled in the art. For example, slurries may be prepared using the titanium dioxide powders prepared using the process of this disclosure. Surface treatment may also be provided to enhance the properties of the so prepared powders.

The present disclosure is further illustrated by the following examples, but these examples should not be construed as limiting the scope of the disclosure.

Test Methods

Chloride Level Measurement:

10.0+/−0.1 g of dry sample (pigment) were weighed and added to a 250-ml beaker containing 50-75 ml distilled $H_2O$. The pigment was slurried and diluted to approximately the 100-mL mark with distilled water and the pH of the diluted slurry sample was checked. Nitric acid (20% soln.) was added to the slurry dropwise to adjust the pH to 3.0+/−0.5. The slurry was magnetically stirred during the additions. The slurry was then titrated with $AgNO_3$ (0.1 Normal) until the millivolt reading reached 250+10 millivolts (240-260 millivolts). The chloride level in the pigment was calculated as follows:

Chloride (ppm)=ml of 1N $AgNO_3$×354.5

Carbon Black Undertone

The carbon black undertone (CBU) of a $TiO_2$ pigment sample was measured according to the methods described in U.S. Pat. Nos. 2,488,439 and 2,488,440, the disclosures of which are hereby incorporated by reference, using a benchmark value of 10 rather than 100 as used in the patents. The CBU was measured by mulling together a suitable liquid, such as light colored oil, the $TiO_2$ pigment sample, and carbon black. The mixture was spread on a panel and the relative blueness of the gray mixture was observed. Pigments containing smaller sized particles have a relatively high CBU and a bluer undertone. Pigments with larger sized particles have a relatively low CBU and have a more yellowish undertone.

EXAMPLES

Example 1

$TiCl_4$ was thoroughly premixed with sufficient $AlCl_3$ to provide one percent by weight $Al_2O_3$ based on total solids formed in the oxidation reaction. The $TiCl_4$ was evaporated, preheated and introduced into a reaction zone. Simultaneously, preheated oxygen was continuously introduced through a separate inlet to the reaction zone. Trace amounts of KCl dissolved in water were added to the oxygen stream as disclosed in Example 1 of Lewis et al., U.S. Pat. No. 3,208,866. The reactants streams were rapidly mixed. The gaseous suspension of titanium dioxide pigment formed in the reactor at a temperature in the range of about 900° C. to 1600° C. was discharged to a cooling conduit (flue) and quickly cooled. Calcined titanium dioxide which served as the scrubbing medium to enable heat transfer to cool the reactants stream, was introduced into the gaseous suspension at the front end of the conduit, in an amount of about 1 wt. % based on total solids in the conduit as disclosed in Example 1 of U.S. Pat. No. 2,899,278 and in Example 1 of U.S. Pat. No. 4,784,841. Silicon tetrachloride was injected along the conduit as disclosed in U.S. Pat. No. 6,852,306 to provide a substantially uniform encapsulation of 3-wt. % pyrogenic $SiO_2$ onto the $TiO_2$ pigment surface. The $TiO_2$ pigment was separated from the cooled gaseous products by conventional means. The Carbon Black Undertone (CBU) of the resulting $TiO_2$ pigment, measured as described above, was about 12 and the adsorbed chloride level on the pigment surface was measured at about 1200 ppm.

The $TiO_2$ pigment obtained was then ground using a commercial fluid energy mill and high pressure steam. The steam supply temperature to the mill was varied from about 275 to 350° C. and the pressure was about 450 psig. Trimethylphosphate (TMP) was used as a grinding aid in the fluid energy mill.

The downstream temperature of the fluid energy mill ranged from 175° C. to 250° C. The steam also served to react oxychlorides present in the powder, releasing gaseous HCl.

The steam and HCl were separated from the milled powder using bag filtration, which is a conventional gas/solids separation technology employed in the $TiO_2$ industry. Milled $TiO_2$ powder was sampled and measured for chlorides. Chloride concentrations of less than 50-ppm were achieved at fluid energy mill downstream temperatures of greater than 200° C. Chloride concentrations of about 150-ppm were achieved at fluid energy mill downstream temperatures of about 175° C.

Example 2

The process of comparative Example 1 was repeated with the following exceptions. The CBU was increased and the wt. % of pyrogenic $SiO_2$ encapsulation was lowered.

Approximately 18-CBU titanium dioxide dry powder, containing less than 1-wt. % calcined $TiO_2$ scrubs, uniformly encapsulated with approximately 1-wt. % pyrogenic $SiO_2$, and containing 1,800-ppm chlorides was processed through the same commercial fluid energy mill. Steam supply temperature was varied to control the downstream temperature of the mill in a range from approximately 185° C. to 220° C. The steam also served to react with the oxychlorides present in the powder, releasing gaseous HCl. The steam and HCl where separated from the milled powder using bag filtration, which is a conventional gas/solids separation technology employed in the $TiO_2$ industry. Milled powder was sampled and measured for chlorides. Chloride concentrations of less than 60-ppm were achieved at fluid energy mill downstream temperatures of greater than 220° C. Chloride concentrations of about 90-ppm were achieved at fluid energy mill downstream temperatures of about 185° C.

Example 3

The process of comparative Example 1 was repeated with the following exceptions. The wt. % of pyrogenic $SiO_2$ encapsulation was lowered and an 8 inch fluid energy mill was used.

Approximately 12-CBU titanium dioxide dry powder, containing less than 1-wt. % calcined $TiO_2$ scrubs, uniformly encapsulated with approximately 0.7-wt. % pyrogenic $SiO_2$, and containing approximately 1,000-ppm chlorides was processed through an 8 inch fluid energy mill. Steam supply temperature was 400° C. to control the downstream temperature of the mill to approximately 300° C. The steam also served to react with the oxychlorides present in the powder, releasing gaseous HCl. The steam and HCl where separated from the milled powder. Milled powder was sampled and measured for chlorides. Chloride concentrations between 30 to 40-ppm were achieved at fluid energy mill downstream temperatures of about 300° C.

Example 4

Control

The process of comparative Example 1 was repeated with the following exceptions. No pyrogenic $SiO_2$ encapsulation was used in this example.

Approximately 18-CBU titanium dioxide dry powder, containing less than 1-wt. % calcined $TiO_2$ scrubs, and containing 1,800-ppm chlorides was processed through the same commercial fluid energy mill. Steam supply temperature was varied to control the downstream temperature of the mill in a range from approximately 250° C. to 265° C. The steam also served to react with the oxychlorides present in the powder, releasing gaseous HCl. The steam and HCl where separated from the milled powder using bag filtration, which is a conventional gas/solids separation technology employed in the $TiO_2$ industry. Milled powder was sampled and measured for chlorides. Chloride concentrations were not less than 152-ppm at fluid energy mill downstream temperatures of 260° C.

In summary, chloride concentrations of less than about 60-ppm in the milled $TiO_2$ powder are measured at fluid energy mill downstream temperatures of 200° C. to about 600° C. when a substantially uniform encapsulation of pyrogenic $SiO_2$ is present on the surface of $TiO_2$ powder.

The data Table below summarizes Examples 1-4.

| Example | CBU | Loading of Pyrogenic SiO2, % | Chloride Conc. in ppm | Chloride Conc. out ppm | Mill Out. Temp deg C. |
|---|---|---|---|---|---|
| 1 | 12 | 3 | 1200 | <50 | >200 |
| 1 | 12 | 3 | 1200 | ~150 | ~175 |
| 2 | 18 | 1 | 1800 | <60 | >220 |
| 2 | 18 | 1 | 1800 | ~90 | ~185 |
| 3 | 12 | 0.7 | 1000 | 30-40 | ~300 |
| 4 | 18 | 0 | 1800 | >152 | ~260 |

What is claimed is:

1. A process for producing titanium dioxide pigment, comprising:
   a) reacting titanium tetrahalide vapor, a rutile-forming agent and at least a stoichiometric amount of oxygen in a reactor to form a gaseous suspension comprising titanium dioxide particles;
   b) introducing silicon tetrachloride into the reactor at least one point downstream of the point of contact of the titanium tetrahalide, the rutile forming agent and the oxygen, and where at least 97% of the titanium tetrahalide has been converted to titanium dioxide;
   c) passing the gaseous suspension to a cooling conduit;
   d) introducing scouring, material particles, selected from the group consisting of calcined titanium dioxide and compressed titanium dioxide, and mixtures thereof, into the cooling conduit; wherein the scouring material particles have a diameter in the range of about 0.25 mm to about 12.7 mm and forming a cooled product having a solid and a vapor phase;
   e) separating the vapor phase from the cooled product to form a powder comprising the titanium dioxide particles, chlorine-containing material comprising about 500 to about 3000 ppm of one or more oxychlorides, and the scouring material; and
   f) subjecting the powder to fluid energy milling in a fluid energy mill and substantially uniform heating at a temperature of about 200° C. to about 600° C., in the presence of moisture, the substantially uniform heating in the presence of moisture taking place in the fluid energy mill, to reduce the content of chlorine containing materials to an oxychlorides content of less than about 60 ppm; wherein the moisture present is in at least a stoichiometric amount with the oxychloride.

2. The process of claim 1 wherein the chlorine-containing material comprises about 30 to about 40 ppm of one or more oxychlorides.

3. The process of claim 1 wherein: step (f) forms a milled powder comprising particles having a mean particle size of about 50 nm to about 1000 nm.

4. The process of claim 3 wherein step (f) forms a milled powder comprising particles having a mean particle size of about 100 nm to about 250 nm.

5. The process of claim 1 wherein the temperature is about 250° C. to about 400° C.

6. The process of claim 3 wherein the fluid energy mill comprises a heated fluid selected from the group consisting of steam, aft, argon, helium, nitrogen and mixtures thereof.

7. The process of claim 6 where in the heated fluid is steam.

8. The process of claim 1 wherein the fluid energy mill is a micronizer.

9. The process of claim 8 wherein the micronizer comprises a heated fluid selected from the group consisting of steam, air, argon, helium, nitrogen and mixtures thereof.

10. The process of claim 9 wherein the heated fluid is steam.

11. The process of claim 8 wherein the powder is substantially uniformly heated at a temperature of about 250° C. to about 400° C.

12. The process of claim 11 wherein the powder is substantially uniformly heated at a temperature of about 250° C. to about 300° C.

13. The process of claim 1 wherein step (f) is carried out in a space having a vapor space the vapor space having an amount of free chlorine and the amount of free chlorine in the vapor space is less than about 1 ppm.

14. The process of claim 1 wherein the rutile-forming argent aluminum halide.

* * * * *